United States Patent
Spinelli et al.

(10) Patent No.: US 11,256,825 B2
(45) Date of Patent: *Feb. 22, 2022

(54) SYSTEMS AND METHODS FOR SECURING DATA IN ELECTRONIC COMMUNICATIONS

(71) Applicant: EQUIFAX, INC., Atlanta, GA (US)

(72) Inventors: Tony Spinelli, Alpharetta, GA (US); David Hannigan, Cumming, GA (US); Nick Nedostup, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/548,600

(22) Filed: Aug. 22, 2019

(65) Prior Publication Data

US 2019/0377896 A1    Dec. 12, 2019

Related U.S. Application Data

(63) Continuation of application No. 12/365,974, filed on Feb. 5, 2009, now Pat. No. 10,430,604.

(60) Provisional application No. 61/026,256, filed on Feb. 5, 2008.

(51) Int. Cl.
*G06F 21/62* (2013.01)
*G06Q 20/00* (2012.01)

(52) U.S. Cl.
CPC ......... *G06F 21/6227* (2013.01); *G06Q 20/00* (2013.01)

(58) Field of Classification Search
CPC .................................. G06F 21/6227
USPC ........................................... 705/50
See application file for complete search history.

(56) References Cited

U.S. PATENT DOCUMENTS

| | | | |
|---|---|---|---|
| 5,473,607 A | 12/1995 | Hausman et al. | |
| 7,603,344 B2 | 10/2009 | Bousquet et al. | |
| 7,788,235 B1 | 8/2010 | Yeo | |
| 7,934,098 B1 | 4/2011 | Hahn et al. | |
| 8,099,785 B1 | 1/2012 | Pavlyushchik et al. | |
| 2002/0042796 A1* | 4/2002 | Igakura | G06F 16/10 |
| 2002/0136381 A1* | 9/2002 | Shaffer | H04M 3/4931 379/201.02 |
| 2003/0140049 A1* | 7/2003 | Radatti | G06F 16/10 |
| 2003/0154406 A1 | 8/2003 | Honarvar et al. | |
| 2004/0199490 A1 | 10/2004 | Peled et al. | |
| 2004/0225645 A1 | 11/2004 | Rowney et al. | |
| 2006/0224602 A1 | 10/2006 | Rawat et al. | |
| 2007/0179903 A1 | 8/2007 | Seinfeld et al. | |
| 2008/0010686 A1 | 1/2008 | Nemoto et al. | |

(Continued)

OTHER PUBLICATIONS

"Consumer Credit Reports from Equifax", Equifax, Inc., 2007.

(Continued)

*Primary Examiner* — Chinedu C Agwumezie
(74) *Attorney, Agent, or Firm* — Kilpatrick Townsend & Stockton LLP

(57) ABSTRACT

Certain embodiments involve data security. For instance, Records having sensitive information can be transformed to generate transformed data using a hashing algorithm. An electronic communication comprising content can be received. Transformed content can be generated by transforming the content. The transformed content can be compared to the transformed data. The transformed content can be determined to match at least one of the transformed records. The electronic communication can be prevented from being transmitted to a network.

20 Claims, 3 Drawing Sheets

(56) References Cited

U.S. PATENT DOCUMENTS

| | | |
|---|---|---|
| 2008/0216172 A1 | 9/2008 | Forman et al. |
| 2009/0083545 A1 | 3/2009 | Heim et al. |
| 2009/0144102 A1 | 6/2009 | Lopez |
| 2009/0205051 A1 | 8/2009 | Spinelli et al. |
| 2009/0265768 A1 | 10/2009 | Labaton |
| 2010/0017844 A1 | 1/2010 | Barve et al. |
| 2011/0041158 A1 | 2/2011 | Ranzini et al. |
| 2011/0125619 A1 | 5/2011 | Talbert et al. |

OTHER PUBLICATIONS

"McAfee Retail Software Launches Internet Guard Dog Pro with Personal Firewall for Enhanced Security", PR Newswire, May 25, 2000.
"The Insider: A True Story Explores Identity Theft by Malicious Insiders and How to Guard Against It", PR Newswire, Aug. 1, 2005.
"Vontu Introduces the Industry's First Solution to Monitor and Stop Data From Leaving Corporate Networks via the Internet", PR Newswire, Jan. 24, 2005.
"Vontu: Company Overview: Customers", Internet Archive Wayback Machine, Available online at: http://www.vontu.com/company/customers.asp, Jan. 22, 2007.
U.S. Appl. No. 12/365,974, "Final Office Action", dated Jun. 12, 2015, 19 pages.
U.S. Appl. No. 12/365,974, "Final Office Action", dated Nov. 14, 2016, 31 pages.
U.S. Appl. No. 12/365,974, "Non-Final Office Action", dated Nov. 18, 2014, 18 Pages.
U.S. Appl. No. 12/365,974, "Non-Final Office Action", dated May 5, 2016, 26 pages.
U.S. Appl. No. 12/365,974, "Notice of Allowance", dated May 21, 2019, 18 pages.
U.S. Appl. No. 12/365,974, "Office Action", dated Jan. 24, 2012, 19.
U.S. Appl. No. 12/365,974, "Office Action", dated Jul. 25, 2012, 18.
U.S. Appl. No. 12/365,974, "Office Action Response", dated Sep. 12, 2012, 15.
Connolly, "Content Security Made Simple", Infoworld, vol. 25, No. 27, Jul. 14, 2003, p. 35.
Dyck, "Teros Protects SSN Net Traffic", eWeek, vol. 20, No. 15, Apr. 14, 2003, p. 56.
MacVittie, "Vontu Protect Monitors Data Departures", Network Computing, Available online at: http://www.networkcomputing.com/wan-optimization-and-application-acceleration/229620897, May 21, 2004.
Menezes, et al., "Handbook of Applied Cryptography", CRC Press LLC, Available online at: www.cacr.math.uwaterloo.edu/hac, 1997.
Messmer, "Vontu Crawls in to Stop Data Leaks", Network World, Available online at: http://www.networkworld.com/news/2005/072505-vontu.html, Jul. 25, 2005.
Simon, "Card Options for those Under 18", Available online at: http://www.creditcards.com/credit-cardnews/prepaid-credit-cards-for-younger-users-1279.php, May 22, 2007.
White, "How Computers Work", Que Publishing, Seventh Edition, ISBN 0-7897-3033-2, Oct. 15, 2003.
White, "How Computers Work: Millennium Edition", Millennium Ed., Que Corporation, Indianapolis, Sep. 1999, pp. 432.

\* cited by examiner

SYSTEMS AND METHODS FOR SECURING DATA IN ELECTRONIC COMMUNICATIONS

CROSS-REFERENCE TO RELATED APPLICATIONS

This application is a continuation of U.S. patent application Ser. No. 12/365,974, filed Feb. 5, 2009, which claims the benefit of U.S. Provisional Patent Application No. 61/026,256, filed Feb. 5, 2008, which are herein incorporated by reference in their entirety.

TECHNICAL FIELD

This disclosure relates generally to data security and, specifically, to preventing sensitive information from leaving an organization via electronic communication using data from a credit database.

BACKGROUND

Electronic communication has proved to be an effective, convenient, and efficient method for communicating information and fostering relationships between people. Electronic mail ("email"), one form of electronic communication, in particular is an effective tool with which data and information can be conveyed quickly and easily to large numbers of people. An email program on a computer connected to a network can be used to send information and electronic files to other individuals by entering the information in an email message and/or attaching an electronic file to the message. The email message is sent over the network to the individual's email address, and the individual can receive the message almost instantaneously after it is sent. Using electronic communication, business can be conducted and relationships formed in a very quick and efficient manner.

The advantages that email, or any form of electronic communication, provides are balanced with potential misuses of these convenient tools. One potential misuse is conveying, intentionally or unintentionally, sensitive information via an electronic communication tool. For example, an organization, such as a business, may store sensitive information that may be accessible to certain employees or other people associated with the organization. The sensitive information may include trade secrets and/or social security number information of employees or customers. An electronic communication tool such as email may be used to access the sensitive information and send it to a recipient outside of the organization. In some instances, the sensitive information may be conveyed unintentionally by an employee mistakenly sending the wrong file or inputting the wrong email address of the intended recipient. In other instances, persons with ill intent may purposefully send sensitive information to an outside recipient to reap ill-gained benefits or otherwise to detrimentally affect the organization. The sensitive information, particularly social security numbers, may be used for illegal purposes or for gaining an illegal advantage over the organization.

Detecting and stopping such misuses of electronic communication is difficult and can be resource intensive. Some systems use a set of sensitive information and compare content of electronic communications leaving an organization server to detect content that matches the sensitive information. The set of sensitive information is transformed into a selected format and stored. Content of outgoing electronic communications, including the content of the message within the communication and content of any attachments, is transformed into the same selected format and compared to the transformed sensitive information. If a match occurs, the electronic communication can be prevented from leaving servers managed by the organization. Such a system, however, requires diligence to ensure that the sensitive information is updated, complete, and accurate in order to provide an effective system. Use of inaccurate information may result in "false positive" matching, in which an electronic communication that does not include sensitive content is erroneously identified as including sensitive content, as well as "false negative" errors, in which an electronic communication that includes sensitive content is not identified. Use of incomplete information often results in "false negative" errors. Moreover, a relatively large and accurate set of sensitive information, including social security numbers, is not readily available to most organizations, which therefore rely on incomplete or inaccurate data to detect sensitive information in electronic communications. Accordingly, a need exists for systems and methods for using a set of sensitive information that is relatively complete and accurate for detecting sensitive information in electronic communications and preventing such communications from reaching their intended recipient.

BRIEF DESCRIPTION OF APPLICATION DRAWINGS

DETAILED DESCRIPTION

Certain aspects and embodiments relate to receiving credit-related data provided from a credit database to which content from electronic communications can be compared to detect the existence of sensitive information within an electronic communication. Electronic communications including such content can be prevented from leaving the organization. In one embodiment, the data from the credit database includes records. Each record includes a social security number and a name (full or partial name) associated with the social security number. In some embodiments, only a last name is used. The records may include a relatively large set of social security numbers associated with a majority of individuals located within a geographical area defined by a political boundary such as the United States.

The records may be transformed into a selected format by any method, such as an encryption method, to protect the data from access by unauthorized individuals. The transformed data may be stored for subsequent access. Electronic communications, such as emails, originating from within an organization may be received. The content of the electronic communications, including content in files attached or otherwise associated with the electronic communications, can be transformed into the selected format and compared to the transformed data from the credit database. If the transformed content matches at least one record of the transformed data, the electronic communication associated with the transformed content can be flagged or otherwise prevented from leaving the organization.

Illustrative System Implementation

Figure 1:
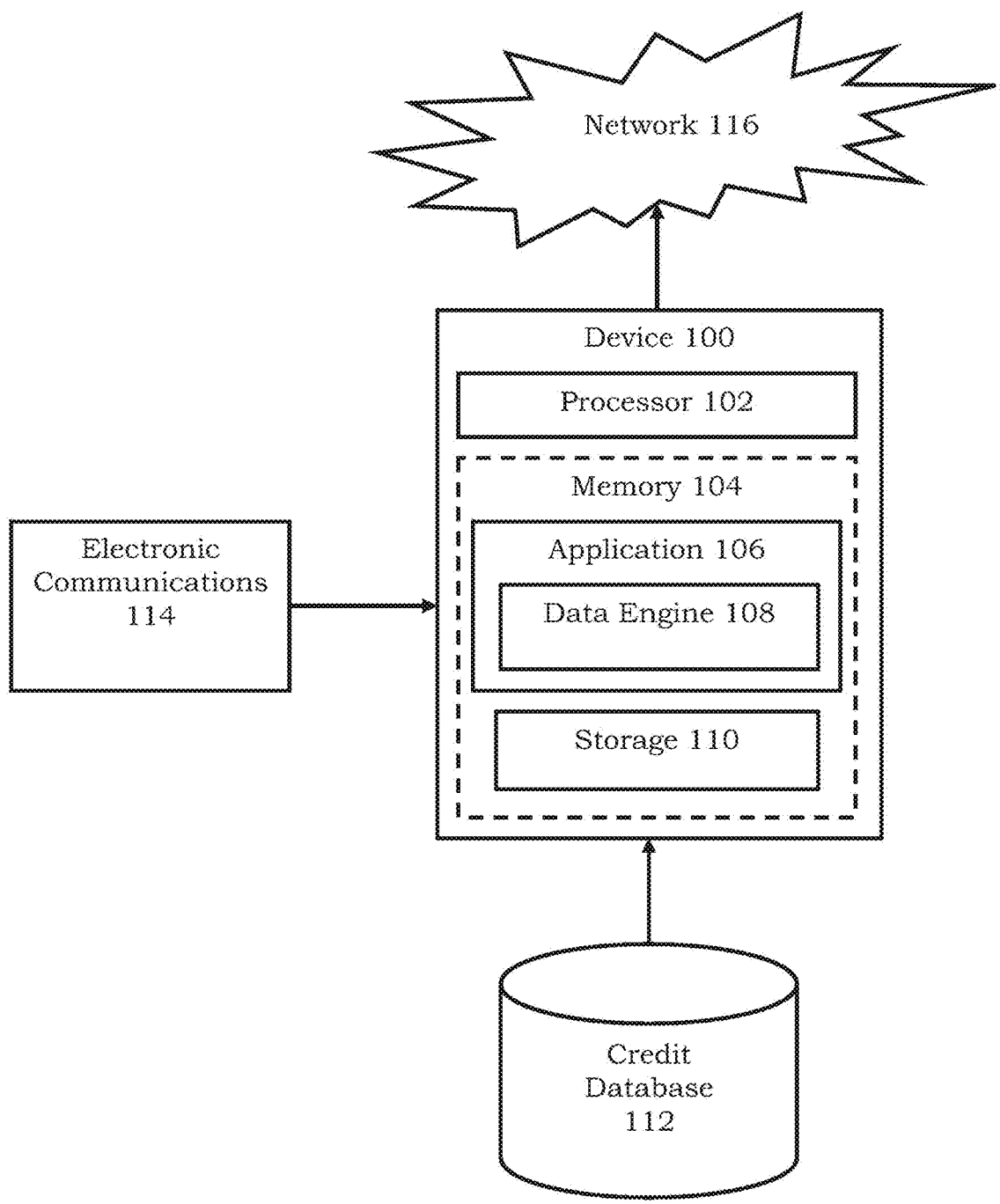
FIG. 1 illustrates a system for detecting electronic communications including sensitive information using data from a credit database according to certain embodiments.

Methods according to various embodiments may be implemented on a variety of different systems. An example of one such system is illustrated in FIG. 1. The system includes a processor-based device 100 that includes a processor 102 and a computer-readable medium, such as memory 104. The device 100 may be any type of processor-based device, examples of which include a computer and a server such as an email server. Memory 104 may be adapted to store computer-executable code and data. Computer-executable code may include an application 106, such as a data management program, that can be used to enter and manage data and electronic communications. The application 106 may include a data engine 108 that, as described in more detail below, may be adapted to perform methods according to various embodiments to transform electronic communication content and data from a credit database and compare the transformed content to the transformed credit database data. In some embodiments, the data engine 108 may be a separate application that is executable separate from, and optionally concurrent with, application 106.

Memory 104 may also include storage 110 that is adapted to store data generated or received by the application 106 or data engine 108. In some embodiments, storage 110 may be separate from device 100, but connected to the device 100 via wireline or wireless connection. Examples of storage 110 include a database, magnetic or optical storage medium, and random access memory.

The device 100 may be in communication with a credit database 112. The credit database 112 may include credit data associated with a relatively large number of individuals and business. In some embodiments, the credit database 112 is associated with a credit bureau such as Equifax, TransUnion, and/or Experian, which collects credit related data and personal information associated with a relatively large number of people within a selected geographical area. The credit database 112 may also include a relatively large and accurate set of social security numbers and a name associated with each of the social security numbers. The credit database 112 may be connected to the device 100 over a network or directly via a wireline or wireless connection. In some embodiments, the device 100 includes the credit database 112. The credit database 112 may alternatively be associated a processor-based device that includes an engine adapted to perform aspects of methods according to certain embodiments. In some embodiments, the credit database 112 is a plurality of databases, each storing credit related data and personal information and accessible to the processor-based device 100.

The device 100 may receive one or more electronic communications 114 and process them or otherwise send them to network 116. The electronic communications 114 may be received over a network, such as an internet or intranet, or directly via a wireline or wireless connection. In some embodiments, the electronic communications 114 include emails from one or more computers or workstations associated with or within the organization. The device 100 may be an email server adapted to receive the emails and process the emails for transmission to the network 116. The network 116 may be any type of network adapted to receive electronic transmissions and carry them to an address or other location associated with the network 116. Examples of network 116 include an internet or an intranet.

In some embodiments, an input device (not shown) and an output device (not shown) may be connected to the device 100 directly or via a network. The input device may be adapted to receive user input and communicate the user input to the device 100. User inputs may include configuring the device 100 to perform various methods according to various embodiments or to provide certain data such as sensitive information. Examples of an input device include a keyboard, mouse, scanner, network connection, and personal computer. In some embodiments, the user may be required to supply authentication credentials to the processor-based device 100 via an input device before access to information and tools stored in the processor-based device 100 is granted to the user. The application 106 may receive the credentials from an input device and access data in local storage 110 to determine if the credentials match stored credentials and to identify the user.

The output device may be adapted to provide data or visual output from the application 106 or the data engine 108. In some embodiments, the output device can display an identification of electronic communications including content that matches data received from the credit database as provided by the application 106 or the data engine 108. Examples of the output device include a monitor, network connection, printer, and personal computer.

In some embodiments, the processor-based device 100 is a server and the input device and output device together form a second processor-based device such as a personal computer. The personal computer may be in communication with the processor-based device 100 via a network such as an internet or intranet. The data engine 108 may be adapted to send web pages to the personal computer for display and receive communications from the personal computer via the network.

Figure 2:
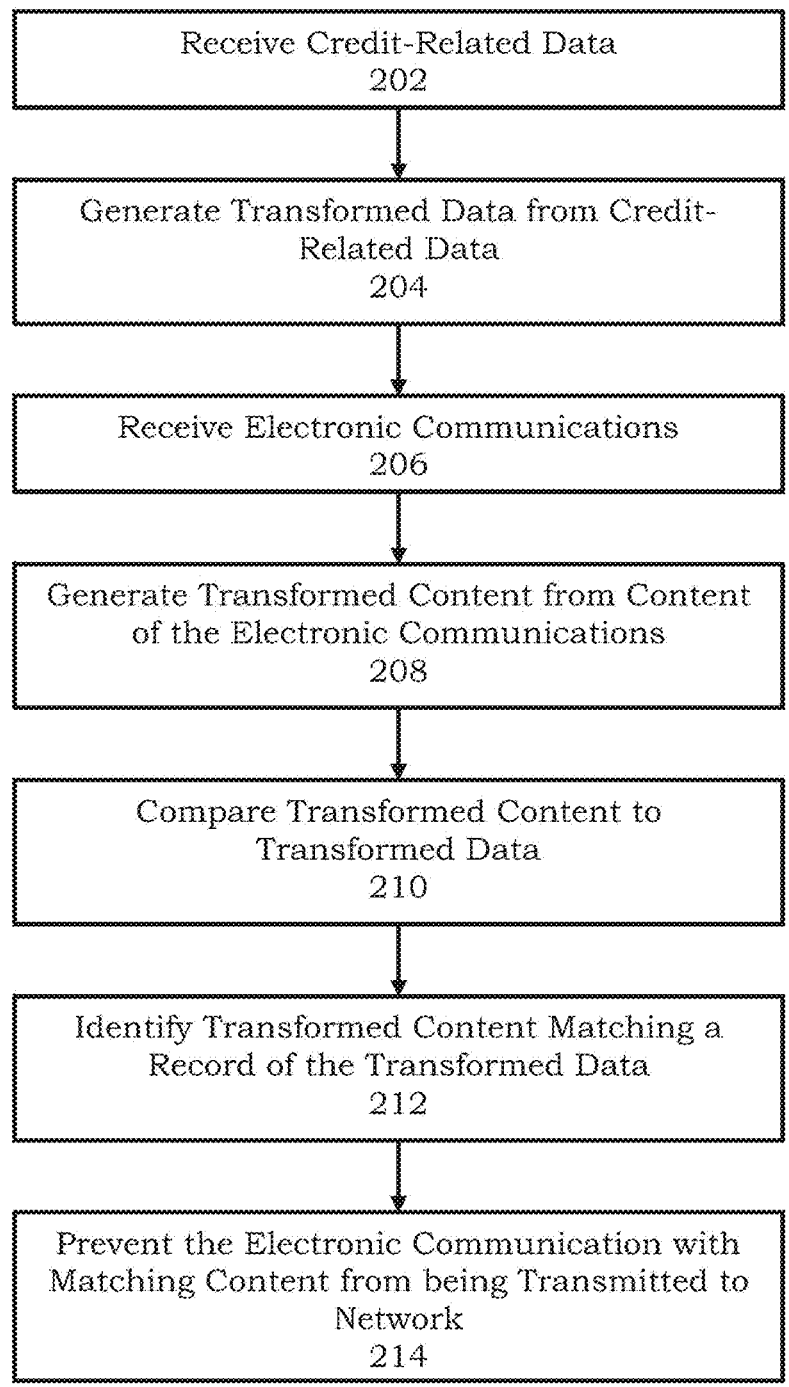
FIG. 2 is a flow chart of a method for detecting electronic communications including sensitive information using data from a credit database according to certain embodiments.

Illustrative Methods for Detecting Sensitive Information in Electronic Communications Using Data from a Credit Database Various methods according to various embodiments can be used to detect electronic communications including sensitive information using data from a credit database and prevent the detected electronic communications from being transmitted outside an organization. FIG. 2 illustrates one embodiment of a method for detecting content using data from a credit database. For purposes of illustration only, the elements of this method are described with reference to the system depicted in FIG. 1. Other implementations are possible.

In block 202, the data engine 108 receives credit-related data provided by the credit database 112. The credit database 112 may include various types of credit-related data for a relatively large number of people such as the majority of people located in a particular geographical area. The various types of credit-related data can include social security numbers, a name associated with each social security number, credit history information, and other personal information such as date of birth, sex, and current and/or past address for each person represented by a social security number. The name may include a full name or a partial name, such as a last name. The credit-related data may include relatively accurate data that is continuously or periodically updated and confirmed by a credit bureau and stored in the credit database 112. The credit-related data may include records. Each record includes selected types or all types of credit related data for a person. For example, each record may include a social security number associated with a person and at least part of the person's name, such as a last name.

The credit database 112 may provide all types of credit-related data stored in the credit database 112 or it may provide certain types of credit-related data. For example, the credit database 112 may provide records that include social security numbers and names associated with the social security numbers, but not include credit history information. The credit database 112 may also provide part of the records stored in credit database 112 instead of all stored records.

The credit database 112 may provide records after receiving an inquiry for the credit-related data from the device 100. In some embodiments, the credit database 112 automatically provides records to the device 100. The credit database 112 may also periodically provide updated records to the device 100. The device 100 receives the records and can provide them to data engine 108 for processing.

In block 204, the data engine 108 generates transformed data from the records. The data engine 108 may generate the transformed data by transforming, encrypting, or otherwise reformatting each record. Users without authorization may be prevented from accessing or viewing the transformed data. Any transformation, encryption, or reformatting method may be used to transform or encrypt each record. In some embodiments, a standard hash algorithm, such as SHA-0, SHA-1, SHA-224, SHA-256, SHA-384, or SHA-512, may be used to transform each record. Transformation methods, for example, may use a key such as a public key, to hash and un-hash data within each record. In some embodiments, the credit database 112 includes or is connected to an engine that is adapted to transform the records to be provided to the device 100 and to provide the transformed data to the device 100.

The transformed data may include a table that includes the transformed records. Without an encryption key, the transformed data may be inaccessible or otherwise not viewable. The raw records (i.e. unencrypted credit-related data) may be destroyed as the transformed data can be used for further processes in accordance with various embodiments without requiring access to the raw records.

The data engine 108 may store the transformed credit-related data. The transformed credit-related data may be stored in local storage 110 or in a separate database (not shown) connected to the device 100. In some embodiments, the transformed credit-related data is stored in a controlled-access location to provide additional security to the data. For example, the device 100 may require appropriate credentials and authenticate a user before allowing access to the location where the transformed credit-related data is stored.

In block 206, the data engine 108 receives electronic communications 114. The electronic communications 114 may be any type of communication that is transmitted electronically to its intended (or unintended) recipients. Examples of electronic communications 114 include emails that include text, pictures, files, or other types of content being conveyed to the recipient. In some embodiments, the data engine 108 is associated with an electronic communication server that handles electronic communication traffic within the organization and/or to or from persons outside the organization. The data engine 108 may be adapted to receive and process only electronic communications intended to be sent outside the organization or to receive and process all electronic communications, even those to and from persons within the organization. The data engine 108 can receive the electronic communications 114 after the electronic communications 114 are caused to be sent by the sender but before the electronic communications are transmitted to a recipient over the network 116.

In block 208, the data engine 108 generates transformed content by transforming the content of each of the electronic communications 114. The data engine 108 may be configured to perform the same transformation methods as those used to transform the credit-related data such that the transformed content is in the same format as the transformed credit-related data. In some embodiments, the data engine 108 retains the original electronic communication in a queue while generating transformed content for comparison to the transformed data. The transformed content may include an identifier that associates the transformed content to the electronic communication from which it originated. The original electronic communication may be retained in the queue until the data engine 108 determines that the content in the electronic communication does not match any of the credit-related data.

In block 210, the data engine 108 compares the transformed content to the transformed data. In some embodiments, the data engine 108 compares the transformed content by searching the transformed data using the transformed content as search values to identify matches of the records in the transformed data. The data engine 108 may also search the transformed data using part of the transformed content. In other embodiments, the transformed data is indexed in a table by records and the data engine 108 can use the index to look up records of the transformed data using the transformed content.

In block 212, the data engine 108 identifies transformed content that matches at least one record of the transformed data. In some embodiments, transformed content matches transformed data if the transformed content matches at least one record to a pre-set level of accuracy. The pre-set level of accuracy may include a percentage of matching. For example, transformed content may include a social security number that matches a social security number in a record except for two numbers that are out of order. The data engine 108 may consider such level of accuracy a match. In some embodiments, the pre-set level of accuracy requires the content include both a social security number and at least part of a name, such as a last name, that matches a record in the transformed data. Upon determining a match, the data engine 108 may identify the electronic communication in the queue that is associated with the identified transformed content.

In block 214, the data engine 108 prevents the electronic communication associated with the matching content from being transmitted to the network 116. The data engine 108 may be configured to tag the identified electronic communication for subsequent follow-up investigations. The data engine 108 may also generate a report that includes information associated with the identified electronic communication. Examples of information include identification of the sender, identification of the recipient, identification of the matching content (either an explicit list of the matching content or the type of matching content), and a time stamp of when the sender caused to electronic communication to be sent. The report may be provided to an output device or automatically sent electronically to an administrator.

In some embodiments, the identified electronic communication is forwarded to an administrator for a quality control review. If the administrator determines that the content is not sensitive information, the administrator can cause the electronic communication to be sent to its intended recipient and configure the data engine 108 to avoid the false match caused by the particular content. If the administrator determines that the content is sensitive information, a follow-up investigation can be initiated to determine if the sender is breaching organizational policy/government laws or included an unintended recipient's electronic address.

Exemplary Implementations

The following is a description of an example of certain embodiments for detecting electronic communications including sensitive information using data from a credit database. It is a description of one example only. Other component and data flows can be used to implement one or more aspects. The example is described with reference to the component and data flow diagram shown in FIG. 3. Functionality provided by a data engine is described with reference to modules stored on two devices: a staging server 308 and prevent server 315. However, the functionality provided by the data engine can be provided by modules located on one device, as is described with reference to FIG. 1, or more than the two devices shown in FIG. 3. The modules may be program code, stored on a computer-readable medium, that is configured to perform functionality described below.

Figure 3:
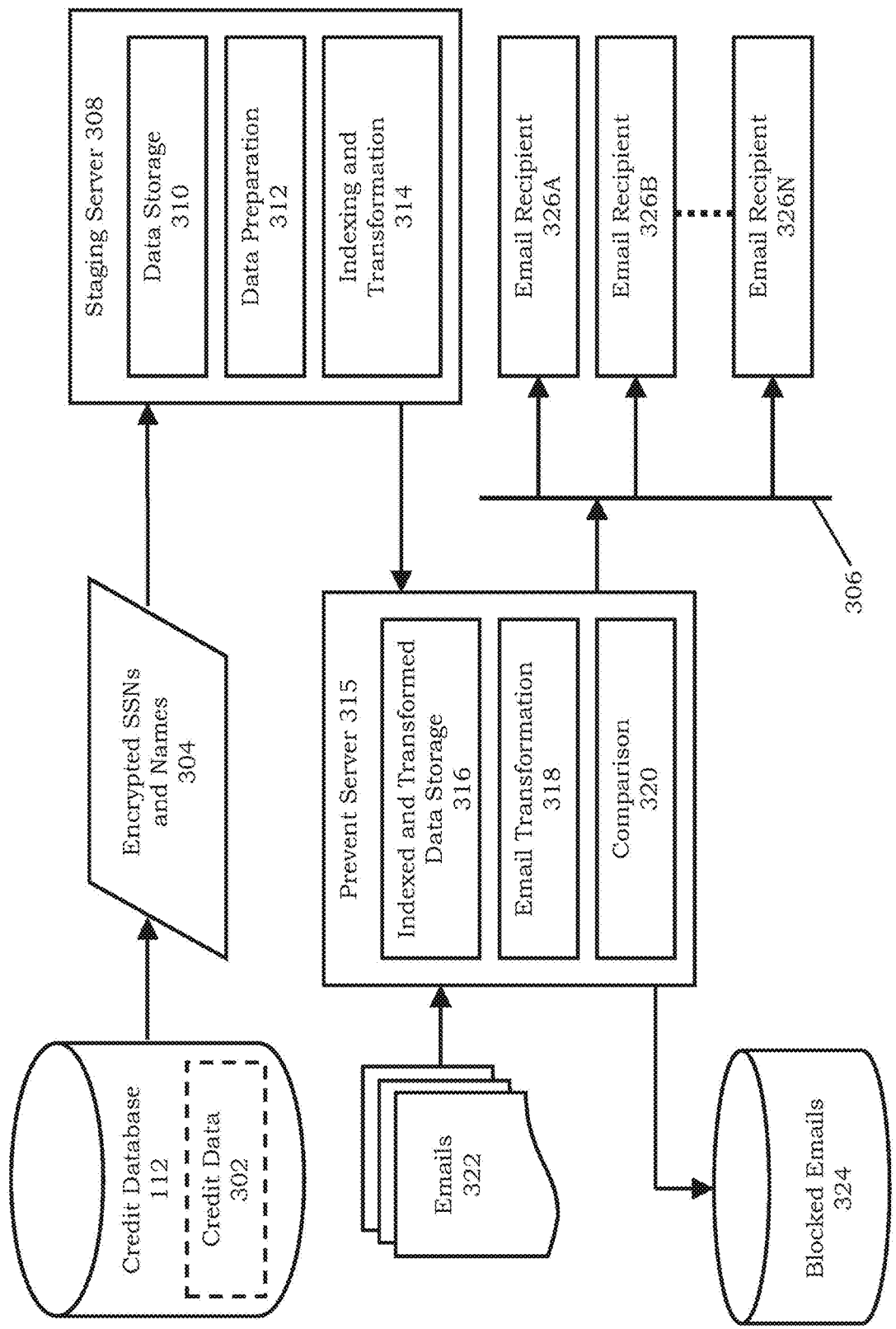
FIG. 3 is a component and data flow diagram of detecting electronic communications including sensitive information using data from a credit database according to certain embodiments.

The credit database 112 that includes credit data 302 is illustrated in FIG. 3. The credit database 112 in FIG. 3 is a database controlled by, or associated with, a credit bureau. An example of credit database 112 is an Automated Credit Reporting Online (ACRO) database provided by Equifax, Inc. of Atlanta, Ga. The ACRO database is a national online consumer credit database that contains more than 200 million consumer credit files updated at least daily with current consumer data from various sources and is operated using advanced search techniques and matching logic. For example, the ACRO database contains consumer credit files for a majority of individuals over the age of eighteen residing within the United States. The consumer credit files can be stored as credit data 302 in the credit database 112. The credit data 302 includes records, where each record is associated with a consumer that is an individual. Each record can include data such as name, date of birth, social security number, current address, former address, former names, telephone number, adverse credit actions, credit activity, employment history, public records, such as bankruptcies, judgments, tax liens, garnishments, and collection accounts, credit inquiries, and payment history.

The credit database 112 is configured to provide part of the data of at least some of the records for use in detecting electronic communications containing sensitive information. For example, the credit database 112 can include a computer program stored in memory that can select specific fields, such as at least part of a name and social security number, of stored records to provide for use in detecting electronic communications detecting sensitive information. The credit database 112 can provide the data via file transfer protocol (FTP) after receiving a request, or otherwise. In the example shown in FIG. 3, the credit database 112 provides a file that includes encrypted social security numbers (SSNs) and names 304 for each record stored in the credit database 112 to a staging server 308. In some embodiments, the SSNs and names 304 include an SSN associated with only a last name. The SSNs and names can be encrypted using NTFS Encrypting File System (EFS) provided by Microsoft Inc. of Redmond, Wash. An example of staging server 308 is a server managed by Symantec Corp. of San Francisco, Calif. The credit database 112 may provide the file over a network (not shown). The network may be the World Wide Web, internet, or Intranet.

The staging server 308 includes three modules: a data storage module 310; a data preparation module 312; and an indexing and transformation module 314. The data storage module 310 is configured to receive the file including the encrypted SSNs and Names 304 via FTP, decrypt the file, and store the decrypted file in the staging server 308. The file may be configured by the credit bureau such that a user accessing the file can write but not read it. The data preparation module 312 is configured to create a prepared file by periodically copying the file to an encrypted directory on the staging server and clean any extra white space and blank entries from the file in preparation for an indexing process. The file may be copied once per week or more frequently. The indexing and transformation module 314 is configured to build a one-way hash table by applying a SHA-1 hashing algorithm to the contents in the prepared file on a periodic basis, such as once per week or more frequently. The result of the hashing algorithm may be data that is 160 bytes per record. In some embodiments, the indexing and transformation module 314 retains the first seven bytes of each record that is 160 bytes in an index table. Retaining less bytes may increase a likelihood of false detections of sensitive information in electronic communications. Retaining more bytes may be more costly to store than the benefits that storing more bytes provides.

After indexing, the staging server 308 automatically pushes the table and the index table to the prevent server 315. The prevent server includes an indexed and transformed data storage module 316 that is configured to keep the table and index table memory resident to allow for fast lookups during inspect. The prevent server 315 includes an email transformation module 318 that is configured to detect emails 322 flowing through the prevent server 315 and hash the emails using a SHA-1 hash algorithm. A comparison module 320 can compare the hashed emails to the table to identify emails that contain sensitive information, such as social security numbers. In some embodiments, the comparison module 320 can evaluate the hashed emails before comparison to reduce false positives and false negatives. A proximity setting can be selected that sets the detail to which the hashed data is evaluated. The comparison module 320 can evaluate the data by breaking the data into components and analyzing the components to identify data that may at first appear to be an SSN when it is a phone number or other numerical identification that is not subject to the entity's sensitive data policy. Data that is not an SSN can be tag to avoid a false positive match. Other data can be compared to the table to identify emails containing sensitive data.

The identified emails can be stored in a blocked email database 324 for auditing and further investigation. Emails that do not include sensitive email can be provided to one or more of email recipients 326A-N that are the intended recipient over network 306, such as the Internet or World Wide Web.

General

The foregoing description of the exemplary embodiments has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application to enable others skilled in the art to utilize the invention and various embodiments and with various modifications as are suited to the particular use contemplated. Alternative embodiments will become apparent to those skilled in the art to which the present invention pertains without departing from its spirit and scope.

The invention claimed is:

1. A computer-implemented method comprising:
   generating, by a computing system located on a first network, transformed comparison content for identifying sensitive information in electronic messages without maintaining the sensitive information at the computing system, wherein generating the transformed comparison content without maintaining the sensitive information comprises:
hashing credit bureau records that include the sensitive information,
storing the transformed comparison content in a memory of the computing system, wherein the transformed comparison content comprises hashed credit bureau records generated by hashing the credit bureau records, and
deleting the credit bureau records from the computing system;
intercepting, by the computing system, a first electronic message containing at least some of the sensitive information and a second electronic message containing at least some of the sensitive information;
determining, by the computing system, that the first electronic message is addressed to the first network and that the second electronic message is addressed to a second network that is external to the first network;
omitting, by the computing system and for the first electronic message addressed to the first network, an operation of determining that hashed content from the first electronic message matches the transformed comparison content;
transmitting, by the computing system, the first electronic message to a recipient on the first network;
hashing, by the computing system, content from the second electronic message; and
performing, by the computing system and based on determining that the second electronic message is addressed to the second network, operations comprising:
determining that the hashed content from the second electronic message matches the transformed comparison content, and
preventing the second electronic message from being transmitted to the second network.

2. The method of claim 1, wherein:
determining that the hashed content from the second electronic message matches the transformed comparison content comprises:
(a) scanning the hashed content from the second electronic message for a portion of the hashed content from the second electronic message that matches a portion of the transformed comparison content, and
(b) flagging the second electronic message based on the portion of the hashed content from the second electronic message matching the portion of the transformed comparison content; and
preventing the second electronic message from being transmitted to the second network comprises transferring the second electronic message, as flagged, to an isolation data structure rather than a computing device on the second network, wherein the isolation data structure is inaccessible to computing device on the second network.

3. The method of claim 1, wherein the credit bureau records include information describing a majority of individuals having an age over a pre-set age and residing in one or more specified geographic regions.

4. The method of claim 1, wherein hashing the credit bureau records and hashing the content of the second electronic message comprises applying a SHA-1 hashing algorithm to the credit bureau records and to the content of the second electronic message.

5. The method of claim 1, further comprising performing, by the computing system, additional operations comprising:
receiving the credit bureau records as encrypted files;
decrypting the encrypted files that are the credit bureau records; and
allowing write-only access to the credit bureau records as decrypted, wherein the write-only access allows users to modify the credit bureau records as decrypted and prevents the users from viewing content of the credit bureau records as decrypted.

6. The method of claim 1, wherein deleting the credit bureau records comprises preventing, by computing devices on the first network, access to content of the credit bureau records by deleting any copies of the credit bureau records from any memory device communicatively coupled to the computing system.

7. The method of claim 1, further comprising electronically transmitting, from the computing system to an administrator, a report subsequent to preventing the second electronic message from being transmitted to the second network, the report comprising:
identification of a sender of the second electronic message;
identification of a recipient on the second network;
identification of the content of the second electronic message; and
a time stamp of transmission by the sender of the second electronic message.

8. The method of claim 7, further comprising performing, by the computing system, additional operations comprising:
receiving, by the computing system and subsequent to the report being transmitted to the administrator, a command from the administrator to transmit the second electronic message to the second network; and
transmitting, by the computing system and responsive to receiving the command, the second electronic message to the recipient on the second network.

9. A computing system comprising;
a staging server located on a first network, the staging server configured for generating transformed comparison content that is usable for identifying sensitive information in electronic messages without maintaining the sensitive information at the computing system, wherein generating the transformed comparison content without maintaining the sensitive information comprises:
hashing credit bureau records that include the sensitive information,
storing the transformed comparison content in a memory of the computing system, wherein the transformed comparison content comprises hashed credit bureau records generated by hashing the credit bureau records, and
deleting the credit bureau records from the computing system; and
a prevent server that is located on the first network, wherein the prevent server is configured for:
intercepting a first electronic message containing at least some of the sensitive information and a second electronic message containing at least some of the sensitive information,
determining that the first electronic message is addressed to the first network and that the second electronic message is addressed to a second network that is external to the first network,
omitting, for the first electronic message addressed to the first network, an operation of determining that hashed content from the first electronic message matches the transformed comparison content, transmitting the first electronic message to a recipient on the first network, hashing content from the second electronic message, and performing, based on determining that the second electronic message is addressed to the second network, operations comprising:
  (a) determining that the hashed content from the second electronic message matches the transformed comparison content, and
  (b) preventing the second electronic message from being transmitted to the second network.

10. The computing system of claim 9, further comprising an isolation data structure on the first network that is inaccessible to computing device on the second network, wherein:
determining that the hashed content from the second electronic message matches the transformed comparison content comprises:
  (a) scanning the hashed content from the second electronic message for a portion of the hashed content from the second electronic message that matches a portion of the transformed comparison content, and
  (b) flagging the second electronic message based on the portion of the hashed content from the second electronic message matching the portion of the transformed comparison content; and
preventing the second electronic message from being transmitted to the second network comprises transferring the second electronic message, as flagged, to the isolation data structure rather than a computing device on the second network.

11. The computing system of claim 9, wherein the credit bureau records include information describing a majority of individuals having an age over a pre-set age and residing in one or more specified geographic regions.

12. The computing system of claim 9, wherein hashing the credit bureau records and hashing the content of the second electronic message comprises applying a SHA-1 hashing algorithm to the credit bureau records and to the content of the second electronic message.

13. The computing system of claim 9, wherein the staging server is further configured for:
receiving the credit bureau records as encrypted files;
decrypting the encrypted files that are the credit bureau records; and
allowing write-only access to the credit bureau records as decrypted, wherein the write-only access allows users to modify the credit bureau records as decrypted and prevents the users from viewing content of the credit bureau records as decrypted.

14. The computing system of claim 9, further comprising one or more processing devices configured for:
electronically transmitting, to an administrator, a report subsequent to preventing the second electronic message from being transmitted to the second network, the report comprising:
  identification of a sender of the second electronic message,
  identification of a recipient on the second network,
  identification of the content of the second electronic message, and
  a time stamp of transmission by the sender of the second electronic message;

receiving, subsequent to the report being transmitted to the administrator, a command from the administrator to transmit the second electronic message to the second network; and
causing, responsive to receiving the command, the second electronic message to be transmitted to the recipient on the second network.

15. A non-transitory computer-readable medium having program code stored thereon that, when executed by one or more processing devices, configures the one or more processing devices to perform operations comprising:
generating, by a computing system located on a first network, transformed comparison content for identifying sensitive information in electronic messages without maintaining the sensitive information at the computing system, wherein generating the transformed comparison content without maintaining the sensitive information comprises:
  hashing credit bureau records that include the sensitive information,
  storing the transformed comparison content in a memory of the computing system, wherein the transformed comparison content comprises hashed credit bureau records generated by hashing the credit bureau records, and
  deleting the credit bureau records from the computing system;
intercepting a first electronic message containing at least some of the sensitive information and a second electronic message containing at least some of the sensitive information;
determining that the first electronic message is addressed to the first network and that the second electronic message is addressed to a second network that is external to the first network;
omitting, for the first electronic message addressed to the first network, an operation of determining that hashed content from the first electronic message matches the transformed comparison content;
transmitting the first electronic message to a recipient on the first network;
hashing content from the second electronic message; and
performing, based on determining that the second electronic message is addressed to the second network, a process comprising:
  determining that the hashed content from the second electronic message matches the transformed comparison content, and
  preventing the second electronic message from being transmitted to the second network.

16. The non-transitory computer-readable medium of claim 15, wherein:
determining that the hashed content from the second electronic message matches the transformed comparison content comprises:
  (a) scanning the hashed content from the second electronic message for a portion of the hashed content from the second electronic message that matches a portion of the transformed comparison content, and
  (b) flagging the second electronic message based on the portion of the hashed content from the second electronic message matching the portion of the transformed comparison content; and
preventing the second electronic message from being transmitted to the second network comprises transferring the second electronic message, as flagged, to an isolation data structure rather than a computing device on the second network, wherein the isolation data structure is inaccessible to computing device on the second network.

17. The non-transitory computer-readable medium of claim 15, wherein the credit bureau records include information describing a majority of individuals having an age over a pre-set age and residing in one or more specified geographic regions.

18. The non-transitory computer-readable medium of claim 15, the operations further comprising:
  receiving the credit bureau records as encrypted files;
  decrypting the encrypted files that are the credit bureau records; and
  allowing write-only access to the credit bureau records as decrypted, wherein the write-only access allows users to modify the credit bureau records as decrypted and prevents the users from viewing content of the credit bureau records as decrypted.

19. The non-transitory computer-readable medium of claim 15:
  wherein hashing the credit bureau records and hashing the content of the second electronic message comprises applying a SHA-1 hashing algorithm to the credit bureau records and to the content of the second electronic message,
  wherein deleting the credit bureau records comprises preventing, by computing devices on the first network, access to content of the credit bureau records by deleting any copies of the credit bureau records from any memory device communicatively coupled to the computing system.

20. The non-transitory computer-readable medium of claim 15, the operations further comprising:
  electronically transmitting, from the computing system to an administrator, a report subsequent to preventing the second electronic message from being transmitted to the second network, the report comprising:
    identification of a sender of the second electronic message,
    identification of a recipient on the second network,
    identification of the content of the second electronic message, and
    a time stamp of transmission by the sender of the second electronic message;
  receiving, subsequent to the report being transmitted to the administrator, a command from the administrator to transmit the second electronic message to the second network; and
  transmitting, responsive to receiving the command, the second electronic message to the recipient on the second network.

* * * * *